US012549252B2

(12) United States Patent
Yoshizawa et al.

(10) Patent No.: US 12,549,252 B2
(45) Date of Patent: Feb. 10, 2026

(54) OPTICAL SIGNAL EMITTING DIRECTION CONTROL APPARATUS AND OPTICAL SIGNAL EMITTING DIRECTION CONTROL METHOD

(71) Applicant: NTT, Inc., Tokyo (JP)

(72) Inventors: Kento Yoshizawa, Musashino (JP); Kazumitsu Sakamoto, Musashino (JP); Takeshi Kinoshita, Musashino (JP); Etsushi Yamazaki, Musashino (JP); Takayuki Mizuno, Musashino (JP); Takuya Ohara, Musashino (JP)

(73) Assignee: NTT, Inc., Tokyo (JP)

( * ) Notice: Subject to any disclaimer, the term of this patent is extended or adjusted under 35 U.S.C. 154(b) by 243 days.

(21) Appl. No.: 18/270,140

(22) PCT Filed: Jan. 5, 2021

(86) PCT No.: PCT/JP2021/000045
§ 371 (c)(1),
(2) Date: Jun. 28, 2023

(87) PCT Pub. No.: WO2022/149179
PCT Pub. Date: Jul. 14, 2022

(65) Prior Publication Data
US 2024/0072892 A1 Feb. 29, 2024

(51) Int. Cl.
*H04B 10/00* (2013.01)
*H04B 10/112* (2013.01)
(Continued)

(52) U.S. Cl.
CPC ........... *H04B 10/112* (2013.01); *H04B 10/25* (2013.01)

(58) Field of Classification Search
CPC ... H04B 10/11; H04B 10/112; H04B 10/1121; H04B 10/1123; H04B 10/1129; H04B 10/116; H04B 10/118
See application file for complete search history.

(56) References Cited

U.S. PATENT DOCUMENTS

| 5,126,869 A | 6/1992 | Lipchak et al. |
| 6,437,890 B1* | 8/2002 | Scheps ................... H04B 13/02 398/104 |
| 2009/0286432 A1* | 11/2009 | Larson ................... B63B 22/20 441/32 |

FOREIGN PATENT DOCUMENTS

| CN | 108063639 A | 5/2018 |
| CN | 108345072 A | 7/2018 |
| (Continued) | | |

OTHER PUBLICATIONS

P. Nabavi et al., Empirical Modeling and Analysis of Water-to-Air Optical Wireless Communication Channels, 2019 IEEE International Conference on Communications Workshops(ICC Workshops), May 2019, pp. 1-6.

*Primary Examiner* — Daniel G Dobson
(74) *Attorney, Agent, or Firm* — Harness, Dickey & Pierce, P.L.C.

(57) ABSTRACT

An optical signal emitting direction control method of a present embodiment includes arranging a transparent member to extend over an underwater space and an in-air space, causing an optical signal to enter the transparent member from the underwater space via a surface of an underwater portion of the transparent member immersed in the underwater space, and causing the optical signal entered the transparent member to be emitted into the in-air space via a surface of an in-air portion of the transparent member exposed to the in-air space.

12 Claims, 3 Drawing Sheets

(51) Int. Cl.
*H04B 10/25* (2013.01)
*H04J 14/00* (2006.01)

(56) References Cited

FOREIGN PATENT DOCUMENTS

| | | |
|---|---|---|
| JP | 04269725 A | 9/1992 |
| JP | 2004320101 A | 11/2004 |
| JP | 2008510181 A | 4/2008 |
| JP | 2012531824 A | 12/2012 |
| WO | WO-2006020353 A1 | 2/2006 |
| WO | WO-2010151702 A1 | 12/2010 |

* cited by examiner

OPTICAL SIGNAL EMITTING DIRECTION CONTROL APPARATUS AND OPTICAL SIGNAL EMITTING DIRECTION CONTROL METHOD

CROSS-REFERENCE TO RELATED APPLICATIONS

This application is a 371 National Stage of International Application No. PCT/JP2021/000045, filed on Jan. 5, 2021. The entire disclosure of the above application is incorporated herein by reference.

TECHNICAL FIELD

The present invention relates to an optical signal emitting direction control apparatus and an optical signal emitting direction control method.

BACKGROUND ART

Since an absorption rate of radio waves is high in an underwater space such as under the sea, the underwater space is an area in which wireless communication is rarely realized, and has been one of the unexplored areas of wireless communication. However, there is a possibility that human activity bases can be formed in the underwater space, for example, by significant progress in science and technology to date and advancement in science and technology in various fields in the future. In a case where such an activity base is used for the purpose of entertainment or the like, there is a demand for a communication method capable of realizing stable signal communication between a signal transmission source or reception destination and the activity base. If at least a part of communication between the underwater space and the ground, an in-air space such as the sky above, or space is performed wirelessly, a system that is more flexible and has higher maintainability and availability than a case where the entire communication is performed by wire is constructed. For example, Non Patent Literature 1 discloses an analysis model of optical wireless communication from an underwater space to an in-air space.

As a conventional communication method in an underwater space, a wired communication method using an electric signal line or the like has been used. Communication using an electric signal line or the like is excellent in stability. On the other hand, in a case where communication is performed wirelessly, signals suitable for use include radio waves, sound waves, and optical waves. In an underwater space, attenuation amount of radio waves is large, and light scattering due to water turbidity occurs, so that the range of the optical wave is short, approximately 10 m. In a case where a sound wave is used, long-distance communication can be realized as compared with radio waves and optical waves, but since the sound wave is a compression wave, the transmission speed is lower than that of the optical wave. Generally, the transmission speed of the sound wave is about 1500 m/s, whereas the transmission speed of the optical wave is about $3\times10^9$ m/s. In a case where a sound wave is used, the propagation speed of the sound wave changes depending on the depth from the water surface, the water pressure, the water temperature, and the salinity concentration, and the influence on communication due to high delay and the Doppler effect and the like cannot be ignored.

CITATION LIST

Non Patent Literature

Non Patent Literature 1: P. Nabavi, et al. "Empirical Modeling and Analysis of Water-to-Air Optical Wireless Communication Channels," 2019 IEEE International Conference on Communications Workshops (ICC Workshops), May 2019, pp. 1-6.

SUMMARY OF INVENTION

Technical Problem

In wireless communication from an underwater space to an in-air space or space, it is possible to reduce signal attenuation due to water and realize long-distance communication by using optical signals instead of radio waves. However, the emission angle of the optical signal from a water surface changes to any angle because the water surface sways due to waves, so that it has been difficult to control the emitting direction of the optical signal, and it has been difficult to stably emit the optical signal to realize a desired gain.

The present invention provides an optical signal emitting direction control method and an optical signal emitting direction control apparatus capable of avoiding the influence of a fluctuation of a water surface, controlling an emitting direction of an optical signal, and realizing stable wireless communication.

Solution to Problem

An optical signal emitting direction control apparatus according to a present embodiment includes a transparent member arranged to extend over an underwater space and an in-air space. In the optical signal emitting direction control apparatus according to the present embodiment, an inclination angle of a surface of an in-air portion of the transparent member exposed to the in-air space is changeable. An optical signal to be transmitted from the underwater space to the in-air space enters the transparent member from the underwater space via a surface of an underwater portion of the transparent member immersed in the underwater space, and thereafter, is emitted into the in-air space via the surface of the in-air portion.

In the optical signal emitting direction control apparatus described above, the transparent member includes a plurality of small members in a height direction. A number of the small members stacked in the height direction is changeable according to a fluctuation of a water surface, and a height of the transparent member may be adjusted by the number of the small members.

In the optical signal emitting direction control apparatus described above, at least one of a refractive index and a polarization characteristic of the transparent member may be changed by application of a voltage.

In the optical signal emitting direction control apparatus described above, an emitting direction of the optical signal emitted from the surface of the in-air portion into the in-air space may be controlled by adjusting at least one of an incident angle of the optical signal incident on the surface of the underwater portion from the underwater space and an inclination angle of the surface of a portion of the in-air portion irradiated with the optical signal.

In the optical signal emitting direction control apparatus described above, the transparent member includes a plurality of small regions having refractive indices different from each other, and an emitting direction of the optical signal emitted from the surface of the in-air portion into the in-air space may be controlled by changing at least one of a refractive index of each of the plurality of small regions and a relative arrangement of the plurality of small regions.

In the optical signal emitting direction control apparatus described above, a color of at least a portion of the transparent member may be a same color as an environmental color around the transparent member.

An optical signal emitting direction control method according to the present embodiment includes arranging a transparent member to extend over an underwater space and an in-air space, causing an optical signal to enter the transparent member from the underwater space via a surface of an underwater portion of the transparent member immersed in the underwater space, and causing the optical signal entered the transparent member to be emitted into the in-air space via a surface of an in-air portion of the transparent member exposed to the in-air space.

Advantageous Effects of Invention

According to the present invention, there are provided an optical signal emitting direction control method and an optical signal emitting direction control apparatus capable of avoiding the influence of a fluctuation of a water surface, controlling an emitting direction of an optical signal, and realizing stable wireless communication.

DESCRIPTION OF EMBODIMENTS

Hereinafter, embodiments of an optical signal emitting direction control apparatus and an optical signal emitting direction control method to which the present invention is applied will be described with reference to the drawings.

First Embodiment

Figure 1:
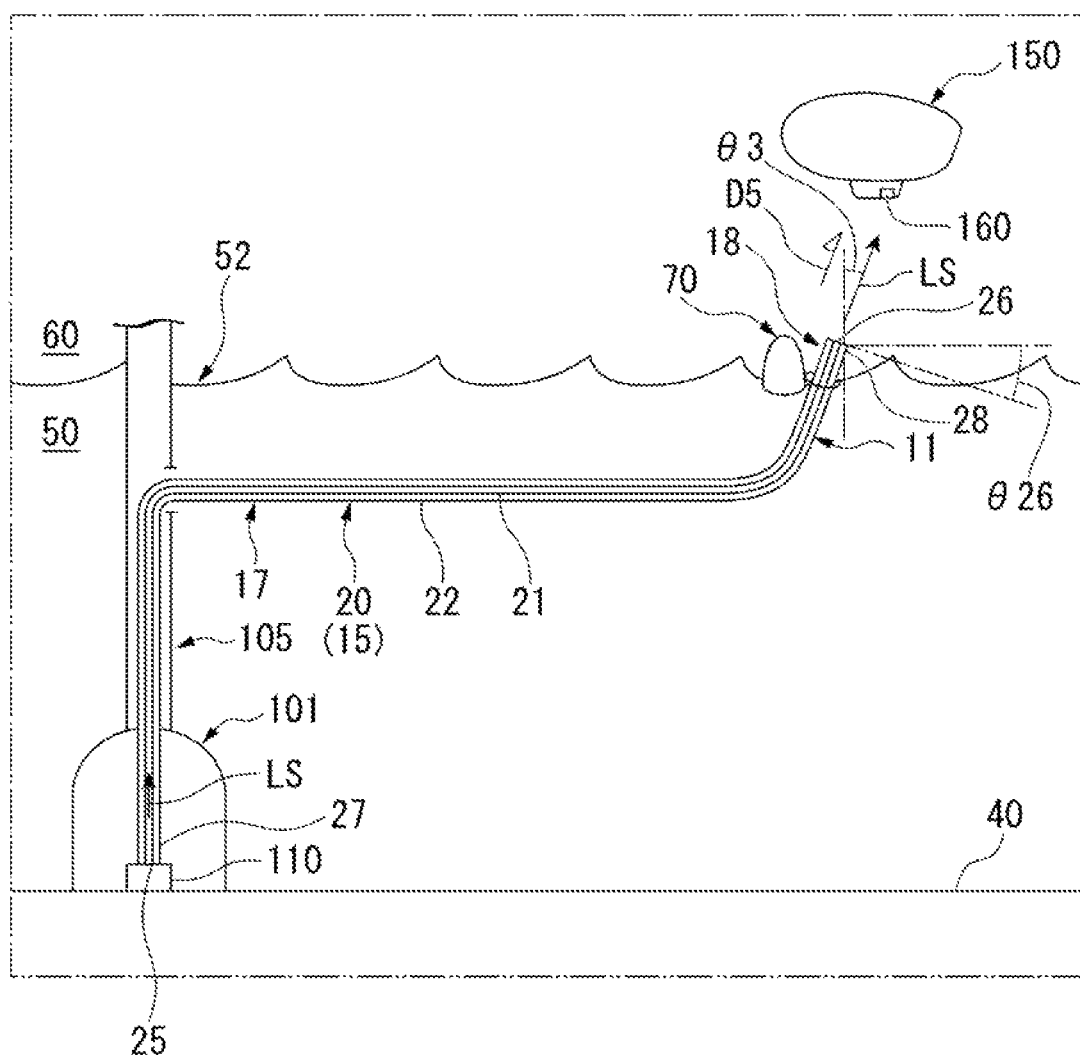
FIG. 1 is a schematic diagram of an optical signal emitting direction control apparatus of a first embodiment to which the present invention is applied.

As shown in FIG. 1, an optical signal emitting direction control apparatus 11 according to a first embodiment to which the present invention is applied is provided for emitting an optical signal LS in a desired emitting direction D5 from an underwater space 50 into an in-air space 60 in the sky above. The optical signal emitting direction control apparatus 11 includes a transparent member 15. The transparent member 15 preferably has a total light transmittance of, for example, 90% or more, at the center wavelength of the optical signal LS. The transparent member 15 of the first embodiment includes an optical fiber (transparent member) 20, the main material of which is quartz. The optical fiber 20 includes, as viewed in a cross section intersecting its axis, a core 21 that is a center portion thereof and a cladding 22 that is provided around the core 21. The refractive index of the cladding 22 is lower than the refractive index of the core 21.

The optical signal LS propagates inside the core 21 along the axis of the optical fiber 20 while repeating total reflection at the interface between the core 21 and the cladding 22.

A facility 101 having an arbitrary purpose of use such as recreation is formed on a bottom 40 of the underwater space 50. The facility 101 is provided with a signal source 110 therein and a lifeline 105 for supplying oxygen, supplies, and the like required for activities in the facility 101 from the ground is connected thereto. An end portion 27 on the input side of the optical fiber 20 is connected to the signal source 110. The optical fiber 20 connected to the signal source 110 comes out of the facility 101, passes through the inside of the lifeline 105, and is discharged from the lifeline 105 into the underwater space 50 at a predetermined position in a lateral direction near a water surface 52 in a depth direction. A portion on the output side of the optical fiber 20 is opened from the lifeline 105 toward the water surface 52. An end portion 28 on the output side of the optical fiber 20 is supported by a buoy 70 installed on the water surface 52, and protrudes from the underwater space 50 into the in-air space 60. An end face 26 on the output side of the optical fiber 20 is exposed to the in-air space 60. That is, the end portion 28 on the output side of the optical fiber 20 is arranged to extend over the underwater space 50 and the in-air space 60. As shown in FIG. 1, the water surface 52 almost always sways and fluctuates, but the end face 26 on the output side of the optical fiber 20 is supported at a position higher than the maximum height of the water surface 52.

Since the optical fiber 20 is arranged and supported as described above, the optical signal emitted from the signal source 110 is transmitted to the end face 26 on the output side of the optical fiber 20 substantially without loss. As a result, most of attenuation and scattering of the optical signal LS in the underwater space 50 is reduced, so that the optical signal LS is stably emitted from the end face 26 on the output side of the optical fiber 20. The buoy 70 can change an inclination angle θ26 of the end face (surface) 26 of an in-air portion 18 of the optical fiber 20 exposed to the in-air space 60 with respect to the horizontal direction. Although not shown, for example, the buoy 70 may be provided with a height-maintaining mechanism so that the optical signal LS is stably emitted. The height-maintaining mechanism detects the maximum height of the water surface 52, and maintains the end on the output side of the optical fiber 20 higher than the maximum height of the water surface 52 detected as described above. By maintaining the end face 26 on the output side of the optical fiber 20 higher than the maximum height of the water surface 52, the influence of waves generated on the water surface 52 can be avoided. The optical signal LS is stably emitted into the in-air space 60 in the emitting direction D5.

A first method for adjusting the emitting direction D5 of the optical signal LS in real time is a method in which the position of the buoy 70 at least in one direction out of the vertical direction and the horizontal direction on the water surface 52 is moved to change the angle of the end portion 28 on the output side of the optical fiber 20 with respect to the vertical direction. A second method for adjusting the emitting direction D5 of the optical signal LS in real time is a method in which an incident angle at the end portion 27 on the input side of the optical fiber 20 when the optical signal LS from the signal source 110 is caused to enter the core 21 is changed. As another method for adjusting the emitting direction D5 of the optical signal LS, there is a method in which the end face 26 on the output side of the optical fiber 20 is cut in advance such that the end face 26 is inclined at a desired angle with respect to a plane orthogonal to the axis of the optical fiber 20. By using these methods, the emitting direction D5 when the optical signal LS is emitted into the in-air space 60 is easily controlled.

The optical signal LS emitted from the end portion 28 on the output side of the optical fiber 20 is received by a receiver 160 of a flight vehicle 150 flying in the sky above the water surface 52, that is, flying in the in-air space 60, for example. In a case where the transparent member 15 is the optical fiber 20, for example, when viewed from the flight vehicle 150, the transparent member 15 looks extremely thin. Even if the optical fiber 20 coming out of the lifeline 105 into the underwater space 50 is near the water surface 52, or even if, like the end portion 28 on the output side, the optical fiber 20 comes out into the in-air space 60 from the water surface 52, it is difficult to confirm the optical fiber 20 by visual observation or the like from a distance on the same waver or ground, or from the sky above or outer space. If scattering of the optical signal LS in the underwater space 50 is ignored, confidentiality of communication by the optical signal LS is enhanced. That is, if a non-target person other than the reception target person of the optical signal LS does not notice the optical fiber 20, it is difficult to notice that the communication of the optical signal LS is performed on the ground in the in-air space 60 or outer space.

An optical signal emitting direction control method of the first embodiment is a method of controlling the emitting direction D5 of the optical signal LS emitted from the transparent member 15 by using the optical signal emitting direction control apparatus 11 described above. As shown in FIG. 1, in the optical signal emitting direction control method of the first embodiment, the optical fiber 20 is arranged as the transparent member 15 to extend over the underwater space 50 and the in-air space 60. The optical signal LS is caused to enter the optical fiber 20 in the underwater space 50 from the signal source 110 installed in the facility 101 in the underwater space 50 via an end face 25 on the input side of the optical fiber 20. The optical signal LS entered the optical fiber 20 and propagated through the core 21 of the optical fiber 20 in the underwater space 50 is caused to be emitted into the in-air space 60 in the emitting direction D5 via the end face 26 on the output side of the optical fiber 20 exposed to the in-air space 60. Of the optical fiber 20, a portion present in the facility 101 and in the underwater space 50 corresponds to an underwater portion 17 of the transparent member 15 immersed in the underwater space 50. Of the optical fiber 20, a portion present in the in-air space 60 corresponds to the in-air portion 18 of the transparent member 15 exposed to the in-air space 60.

The optical signal emitting direction control apparatus 11 of the first embodiment described above includes the optical fiber (transparent member) 20 arranged to extend over the underwater space 50 and the in-air space 60. The inclination angle θ26 of the end face 26 of the end portion (in-air portion) 28 of the optical fiber 20 exposed to the in-air space 60 is changeable by using, for example, the buoy 70 as described above. In the optical signal emitting direction control apparatus 11 of the first embodiment, the optical signal LS to be transmitted from the underwater space 50 to the in-air space 60 enters the optical fiber 20 from the signal source 110 installed in the underwater space 50 via the end face (surface) 25 of the end portion (the underwater portion of the transparent member immersed in the underwater space) 27 on the input side of the optical fiber 20, and thereafter, is emitted into the in-air space 60 via the end face (surface) 26 of the end portion (the in-air portion of the transparent member exposed to the in-air space) 28 on the output side of the optical fiber 20. According to the optical signal emitting direction control apparatus 11 of the first embodiment, even if waves are generated on the water surface 52, the emitting direction D5 of the optical signal LS does not change. Therefore, it is possible to avoid the influence of the fluctuation of the water surface 52, control the emitting direction D5 of the optical signal LS, and realize stable optical communication and wireless communication in the in-air space 60. As a result, it is possible to realize stable wireless communication using the optical signal LS from the underwater space 50 to a base station such as the ground or a satellite, which has been an unexplored area in the past.

In the optical signal emitting direction control apparatus 11 of the first embodiment, the emitting direction D5 of the optical signal LS emitted from the end face 26 of the optical fiber 20 into the in-air space 60 is controlled by adjusting at least one of an incident angle θ1 (not shown in FIG. 1 because it is approximately 0°) of the optical signal LS incident on the end face 25 of the optical fiber 20 from the underwater space 50 with respect to the vertical direction and an inclination angle θ25 (not shown in FIG. 1 because it is approximately 0°) of the end face 25 of the optical fiber 20 with respect to the horizontal direction. According to the optical signal emitting direction control apparatus 11 of the first embodiment, it is possible to easily control the emitting direction D5 of the optical signal LS without using a large and complicated configuration while avoiding the influence of the fluctuation of the water surface 52.

In the optical signal emitting direction control apparatus 11 of the first embodiment, the color of at least a portion of the optical fiber 20 may be the same color as the environmental color around the optical fiber 20. The environmental color includes, for example, the color of water or seawater, the color of the seafloor surface, the color of the ground surface, and the like. For example, of the optical fiber 20, a portion immersed in the underwater space 50, that is, a portion directly in contact with water may be colored blue, which is the same color as the water. Since the optical fiber 20 has the same color as the environmental color in this manner, it is difficult for a non-target person other than the reception target person of the optical signal LS to notice the optical fiber 20. Therefore, confidentiality of communication by the optical signal LS can be enhanced. Note that, out of the core 21 and the cladding 22 of the optical fiber 20, the cladding 22 may be colored to an environmental color to match the environment.

In the optical signal emitting direction control method of the first embodiment, the optical fiber 20 is arranged to extend over the underwater space 50 and the in-air space 60, the optical signal LS is caused to enter the optical fiber 20 from the signal source 110 in the underwater space 50 via the end face 25 of the optical fiber 20, and to be emitted into the in-air space 60 via the end face 26 of the optical fiber 20. According to the optical signal emitting direction control method of the first embodiment, similarly to the optical signal emitting direction control device 11 of the first embodiment, even if waves are generated on the water surface 52, the emitting direction D5 of the optical signal LS is controlled in a predetermined direction. Therefore, it is possible to avoid the influence of the fluctuation of the water surface 52, and realize stable optical communication and wireless communication in the in-air space 60.

Note that, in the optical signal emitting direction control apparatus 11 of the first embodiment, a portion of the optical fiber 20 may not be accommodated in the lifeline 105, and the optical fiber 20 may be directly in contact with water outside the facility 101 and in the underwater space 50. The exposure amount and the support form of the optical fiber 20 in the underwater space 50 are not particularly limited and may be appropriately changed as long as the propagation of the optical signal LS in the core 21 of the optical fiber 20 is not hindered.

Second Embodiment

Next, an optical signal emitting direction control apparatus 12 and an optical signal emitting direction control method of a second embodiment to which the present invention is applied will be described. In the description of the optical signal emitting direction control apparatus 12 and the optical signal emitting direction control method of the second embodiment, contents common to those of the optical signal emitting direction control apparatus 11 and the optical signal emitting direction control method of the first embodiment are denoted by the same reference numerals as those of the optical signal emitting direction control apparatus 11 and the optical signal emitting direction control method of the first embodiment, and overlapping description will be omitted.

Figure 2:
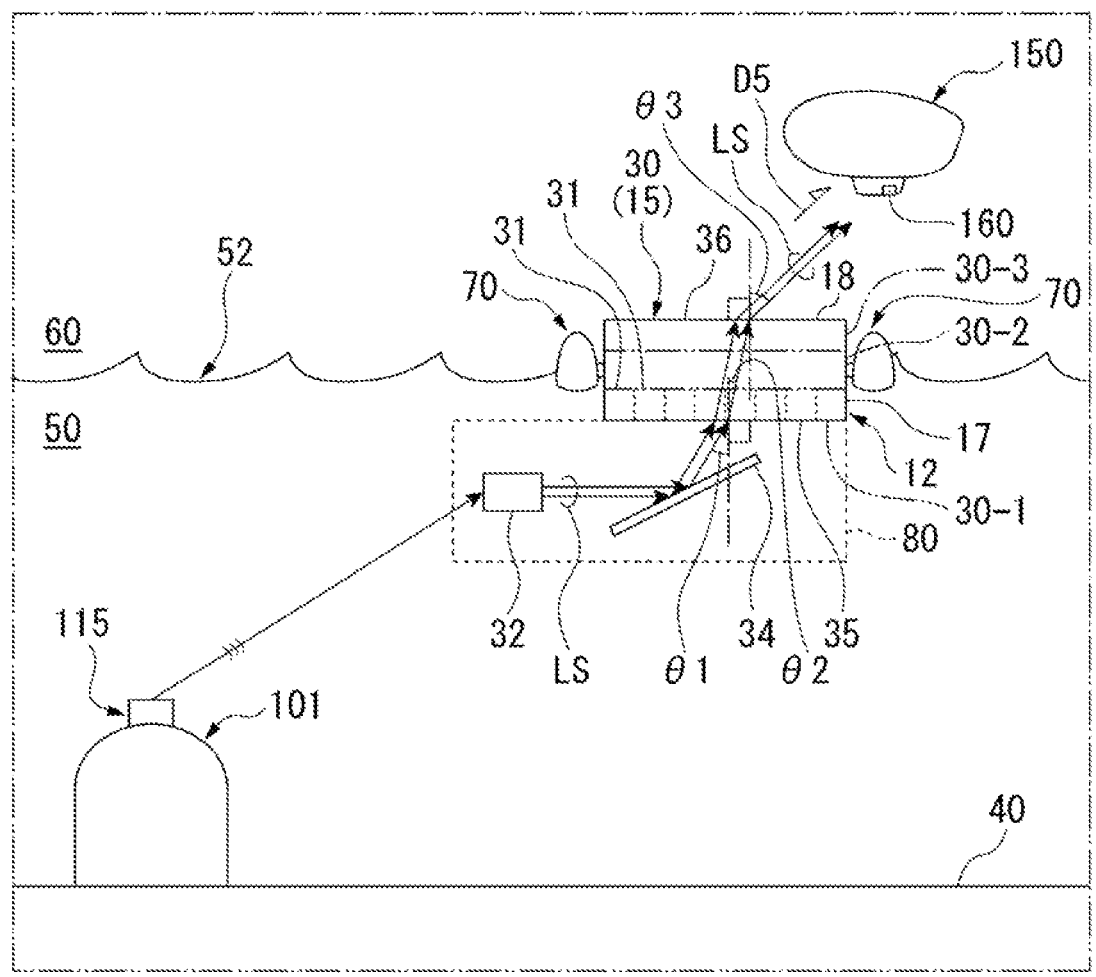
FIG. 2 is a schematic diagram of an optical signal emitting direction control apparatus of a second embodiment to which the present invention is applied.

As shown in FIG. 2, the optical signal emitting direction control apparatus 12 of the second embodiment includes a resin column body 30 made of acrylic resin or the like instead of the optical fiber 20 as the transparent member 15. The resin column body 30 has a uniform refractive index. The resin column body 30 is arranged to extend over the underwater space 50 and the in-air space 60, and is supported by two buoys 70 and 70. Of the resin column body 30, a portion present in the underwater space 50 corresponds to the underwater portion 17 of the transparent member 15 immersed in the underwater space 50. Of the resin column body 30, a portion present in the in-air space 60 corresponds to the in-air portion 18 of the transparent member 15 exposed to the in-air space 60.

An optical signal emitting mechanism 80 is provided below the underwater portion 17 of the resin column body 30, that is, on a bottom 40 side. The optical signal emitting mechanism 80 includes a light source 32 and a reflective mirror 34. For example, as indicated by a broken line in FIG. 2, the optical signal emitting mechanism 80 may include a waterproof wall (not shown) for waterproofing the light source 32 and the reflective mirror 34. The light source 32 emits the optical signal LS similarly to the signal source 110 in the first embodiment. Information related to the optical signal LS is transmitted from, for example, a transmitter 115 provided in the facility 101 to the light source 32 by wire or wirelessly. The optical signal LS emitted from the light source 32 is incident on the reflective mirror 34, specularly reflected, and is incident on a bottom surface (surface) of the resin column body 30 at an incident angle θ1 with respect to the vertical direction. The optical signal LS incident on the resin column body 30 at the incident angle θ1 is refracted at a refraction angle θ2 according to the refractive index of the resin column body 30 on the basis of Snell's law, and is emitted from an upper surface (surface) of the resin column body 30 in the emitting direction D5 that forms an emission angle θ3 with respect to the vertical direction.

In FIG. 2, the resin column body 30 having a rectangular shape in a side view is exemplified as the transparent member 15, but the transparent member 15 in the second embodiment may be one having a large thickness like a so-called rigid body, or may be a large acrylic rod or one like a transparent column. Even if a thin linear member like the optical fiber in the first embodiment is not used as the transparent member 15, by using a rigid body or the like as described above, it is possible to transmit the optical signal LS to the vicinity of the water surface 52 while reducing the influence of attenuation, or cause to emit the optical signal LS into the in-air space 60 while avoiding the influence of waves, similarly to the optical signal emitting direction control device 11 in the first embodiment. In a case where the transparent member 15 is a rigid body, the influence of waves on the material itself having high transparency can be substantially ignored. That is, in a case where a linear object such as the optical fiber 20 is used, influence such as damage due to a tsunami or a large wave equivalent thereto is assumed. However, in the case of a rigid body, the possibility of such damage and the like can be reduced.

In a case where the resin column body 30 as the transparent member 15 is formed of a material larger than the optical fiber 20 and the like, the refractive index, the polarizability, and the like in the resin column body 30 change by applying a voltage to the resin column body 30, and the emitting direction D5 of the optical signal LS changes. Similarly to the first embodiment 1, the emitting direction D5 of the optical signal LS can be finally changed by physically changing the direction and orientation of the material itself (that is, the resin column body 30) of the rigid body by using, for example, the buoys 70 and 70 and by changing the orientation of the light source 32 that causes the optical signal LS to enter.

The resin column body 30 includes a plurality of small regions 31 having refractive indices different from each other. By changing at least one of the refractive index of each of the plurality of small regions 31 and the relative arrangement of the plurality of small regions 31, the propagation speed of the optical signal LS in the resin column body 30 changes, and the emitting direction D5 of the optical signal LS is controlled.

Since a material having high transparency such as the resin column body 30 allows light to pass therethrough, an advantage of the optical signal emitting direction control apparatus 12 is that it is difficult to visually confirm the resin column body 30 from a distance such as the sky above or outer space. Furthermore, by changing the color of the resin column body 30 to match the environmental color, the visibility of the resin column body 30 by visual observation is reduced, and the resin column body 30 becomes hardly visible. The color of the entire resin column body 30 may match the environmental color, and for example, the color of a portion that transmits the optical signal LS may remain transparent, and the color of the surface of the outer portion that covers the portion may be the same color as the environmental color around the resin column body 30.

The optical signal emitting direction control apparatus 12 of the second embodiment described above includes the resin column body 30 arranged to extend over the underwater space 50 and the in-air space 60 as the transparent member 15. An inclination angle θ36 (not shown in FIG. 2 because it is approximately 0°) of a surface 36 of the in-air portion 18 of the resin column body 30 with respect to the horizontal direction is changeable by the buoys 70 and 70 or an inclination angle control mechanism not shown. In the optical signal emitting direction control apparatus 12 of the second embodiment, the optical signal LS to be transmitted from the underwater space 50 to the in-air space 60 enters the resin column body 30 via a surface 35 of the underwater portion 17 of the resin column body 30, and thereafter, is emitted into the in-air space 60 via the surface 36 of the in-air portion 18 of the resin column body 30. According to the optical signal emitting direction control apparatus 12 of the second embodiment, even if waves are generated on the water surface 52, the emitting direction D5 of the optical signal LS does not change. Therefore, it is possible to avoid the influence of the fluctuation of the water surface 52, control the emitting direction D5 of the optical signal LS, and realize stable optical communication and wireless communication in the in-air space 60. As a result, it is possible to realize stable wireless communication using the optical signal LS from the underwater space 50 or under the sea to a base station such as the ground or a satellite.

In the optical signal emitting direction control apparatus 12 of the second embodiment, the resin column body 30 includes a plurality of small members 30-1, . . . , and 30-$m$ (m being a natural number of 2 or more) in the height direction, and a drive mechanism that moves these small members in the height direction. FIG. 2 shows a configuration example in which m=3. According to the optical signal emitting direction control apparatus 12 of the second embodiment, the number of the small members 30-1, . . . , and 30-$m$ stacked in the height direction is changeable by the drive mechanism described above according to the fluctuation of the water surface 52, and the height of the transparent member may be adjusted by the number of the small members. For example, when the wave on the water surface 52 is small, only two small members 30-1 and 30-2 may be stacked in the height direction by using a drive device.

In the optical signal emitting direction control apparatus 12 of the second embodiment, at least one of the refractive index and the polarization characteristic of the resin column body 30 is changed by application of a voltage. The refractive index and the polarization characteristic of the resin column body 30 are not easily grasped even if a non-target person of the optical signal LS visually recognizes the resin column body 30. Therefore, according to the optical signal emitting direction control apparatus 12 of the second embodiment, confidentiality of communication by the optical signal LS can be enhanced.

In the optical signal emitting direction control apparatus 12 of the second embodiment, the incident angle θ1 of the optical signal LS incident on the surface 35 of the underwater portion 17 from the underwater space 50 is changeable by adjusting the inclination angle of the reflective mirror 34 with respect to the horizontal direction, for example. Furthermore, the inclination angle θ36 (not shown in FIG. 2 because it is approximately 0°) of the surface 36 of a portion of the in-air portion 18 irradiated with the optical signal LS with respect to the horizontal direction is changeable by using the buoy 70, by cutting out the in-air portion 18 of the resin column body 30 to conform with a desired inclination angle, or the like. As described above, it is possible to easily control the emitting direction D5 of the optical signal LS emitted from the surface 36 of the in-air portion 18 into the in-air space 60 by adjusting at least one of the incident angle θ1 of the optical signal LS to the underwater portion 17 and the inclination angle θ36 of the surface 36 of the in-air portion 18.

In the optical signal emitting direction control apparatus 12 of the second embodiment, the resin column body 30 includes the plurality of small regions 31 having refractive indices different from each other. Note that, although only the small member 30-1 of the resin column body 30 includes the plurality of small regions 31 in FIG. 2, the small members 30-2 and 30-3 may each include a plurality of small regions 31, and the entire resin column body 30 may include a plurality of small regions 31. The effective refractive index of the resin column body 30 can be adjusted by changing at least one of the refractive index of each of the plurality of small regions 31 and the relative arrangement of the plurality of small regions 31. As a result, the emitting direction D5 of the optical signal LS emitted from the surface 36 of the in-air portion 18 into the in-air space 60 can be freely controlled as compared with a case where the resin column body 30 does not include the plurality of small regions 31.

In the optical signal emitting direction control apparatus 12 of the second embodiment, at least a portion of the resin column body 30 has preferably the same color as the environmental color around the resin column body 30. Since the resin column body 30 has the same color as the environmental color, it is difficult for a non-target person other than the reception target person of the optical signal LS to notice the resin column body 30. Therefore, confidentiality of communication by the optical signal LS can be enhanced.

In the optical signal emitting direction control method of the second embodiment, similarly to the optical signal emitting direction control method of the first embodiment, the transparent member 15 is provided to extend over the underwater space 50 and the in-air space 60, and the resin column body 30 is arranged as the transparent member 15. In the optical signal emitting direction control method of the second embodiment, the optical signal LS is caused to enter the resin column body 30 from the underwater space 50 via the surface 35 of the underwater portion 17 of the resin column body 30, and the optical signal LS entered the resin column body 30 is caused to be emitted into the in-air space 60 via the surface 36 of the in-air portion 18. According to the optical signal emitting direction control method of the second embodiment, it is possible to control the emitting direction D5 of the optical signal LS while avoiding the influence of the fluctuation of the water surface 52, and realize stable optical communication and wireless communication in the in-air space 60.

Although the preferred embodiments of the present invention have been described in detail above, the present invention is not limited to the above-described embodiments. In the present invention, various modifications can be made within the scope of the gist of the present invention described in the claims. Furthermore, configurations in embodiments different from each other may be appropriately combined.

Figure 3:
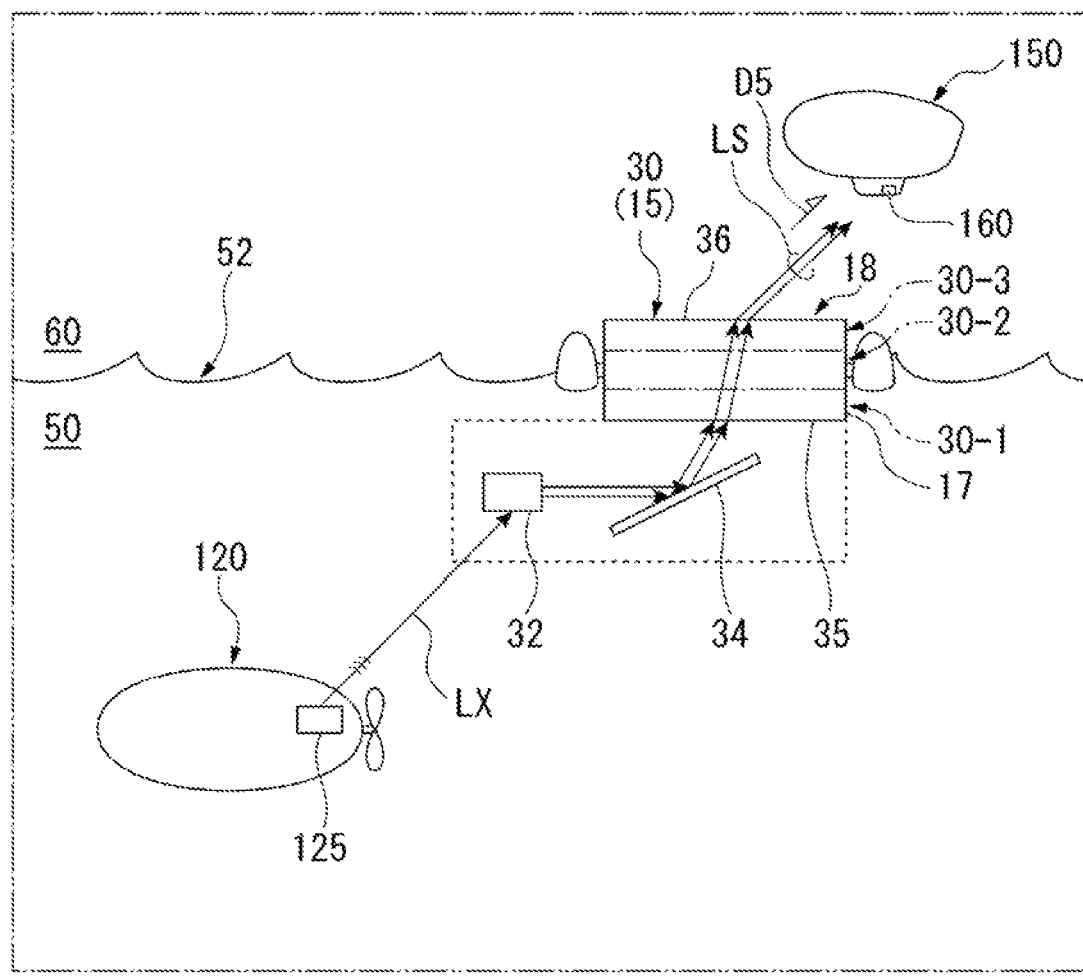
FIG. 3 is a schematic diagram of an optical signal emitting direction control apparatus of a modification of the second embodiment to which the present invention is applied.

For example, in the first embodiment described above, the facility 101 is provided on the bottom 40 of the underwater space 50, the signal source 110 is provided in the facility 101, and the optical signal LS is emitted from the signal source 110. In the second embodiment described above, a signal related to the optical signal LS is transmitted from the transmitter 115 of the facility 101 to the light source 32 in the underwater space 50. That is, in the embodiments described above, the optical signal LS or information necessary for the optical signal LS is transmitted from the facility 101 fixed in the underwater space 50. However, as a modification of the second embodiment, as shown in FIG. 3, for example, a signal LX related to the optical signal LS may be transmitted from a transmitter 125 of a moving body 120 such as a submarine moving in the underwater space 50 to the light source 32.

In the optical signal emitting direction control apparatus and the optical signal emitting direction control method according to the present invention, as long as the optical signal LS can be caused to enter the transparent member 15 via the surface 35 of the underwater portion 17 of the transparent member 15, the type and form of the signal source 110 and the light source 32, the positions where the signal source 110 and the light source 32 are installed in the underwater space 50 or the in-air space 60, and the like are not particularly limited, and are appropriately determined in consideration of the environmental conditions required for wireless communication. Furthermore, the receiver 160 of the optical signal LS may not necessarily be provided in the flight vehicle 150, and may be provided in a facility on the ground in the in-air space 60 or the like. That is, the type and form of the receiver 160, the position where the receiver 160 is installed in the in-air space 60, and the like are not particularly limited as long as the optical signal LS emitted from the surface 36 of the in-air portion 18 of the transparent member 15 in the emitting direction D5 can be received, and are appropriately determined in consideration of the environmental conditions required for wireless communication.

In the optical signal emitting direction control apparatus and the optical signal emitting direction control method according to the present invention, the transparent member is not limited to the optical fiber in which the optical signal propagates along the axis thereof in the core while repeating total reflection at the interface between the core and the cladding as described above, or the resin column body in which the optical signal is refracted on the basis of Snell's law and propagates therein. It is sufficient that the transparent member is a member, in which at least a portion that propagates the optical signal has a suitable total light transmittance, which can be arranged to extend over the underwater space and the in-air space, and in which the optical signal is propagated therein in a direction based on an optical principle or the like and is emitted therefrom in an emitting direction based on an optical principle or the like without being affected by a fluctuation of a water surface.

REFERENCE SIGNS LIST

11, 12 Optical signal emitting direction control apparatus
15 Transparent member
20 Optical fiber
30 Resin column body

The invention claimed is:

1. An optical signal emitting direction control apparatus, comprising a transparent member arranged to extend over an underwater space and an in-air space, wherein
  an inclination angle of a surface of an in-air portion of the transparent member exposed to the in-air space is changeable,
  an optical signal to be transmitted from the underwater space to the in-air space enters the transparent member from the underwater space via a surface of an underwater portion of the transparent member immersed in the underwater space, and thereafter, is emitted into the in-air space via the surface of the in-air portion,
  the transparent member includes a plurality of small members in a height direction, and
  a number of the small members stacked in the height direction is changeable according to a fluctuation of a water surface, and a height of the transparent member is adjusted by the number of the small members.

2. The optical signal emitting direction control apparatus according to claim 1, wherein
  at least one of a refractive index and a polarization characteristic of the transparent member is changed by application of a voltage.

3. The optical signal emitting direction control apparatus according to claim 1, wherein
  an emitting direction of the optical signal emitted from the surface of the in-air portion into the in-air space is controlled by adjusting at least one of an incident angle of the optical signal incident on the surface of the underwater portion from the underwater space and an inclination angle of the surface of a portion of the in-air portion irradiated with the optical signal.

4. The optical signal emitting direction control apparatus according to claim 1, wherein
  the transparent member includes a plurality of small regions having refractive indices different from each other, and
  an emitting direction of the optical signal emitted from the surface of the in-air portion into the in-air space is controlled by changing at least one of a refractive index of each of the plurality of small regions and a relative arrangement of the plurality of small regions.

5. The optical signal emitting direction control apparatus according to claim 1, wherein
  a color of at least a portion of the transparent member is a same color as an environmental color around the transparent member.

6. An optical signal emitting direction control apparatus, comprising
  a transparent member arranged to extend over an underwater space and an in-air space,
  wherein
  an inclination angle of a surface of an in-air portion of the transparent member exposed to the in-air space is changeable,
  an optical signal to be transmitted from the underwater space to the in-air space enters the transparent member from the underwater space via a surface of an underwater portion of the transparent member immersed in the underwater space, and thereafter, is emitted into the in-air space via the surface of the in-air portion,
  at least one of a refractive index and a polarization characteristic of the transparent member is changed by application of a voltage.

7. The optical signal emitting direction control apparatus according to claim 6, wherein
  an emitting direction of the optical signal emitted from the surface of the in-air portion into the in-air space is controlled by adjusting at least one of an incident angle of the optical signal incident on the surface of the underwater portion from the underwater space and an inclination angle of the surface of a portion of the in-air portion irradiated with the optical signal.

8. The optical signal emitting direction control apparatus according to claim 6, wherein
  the transparent member includes a plurality of small regions having refractive indices different from each other, and
  an emitting direction of the optical signal emitted from the surface of the in-air portion into the in-air space is controlled by changing at least one of a refractive index of each of the plurality of small regions and a relative arrangement of the plurality of small regions.

9. The optical signal emitting direction control apparatus according to claim 6, wherein
  a color of at least a portion of the transparent member is a same color as an environmental color around the transparent member.

10. An optical signal emitting direction control apparatus, comprising
  a transparent member arranged to extend over an underwater space and an in-air space,
  wherein
  an inclination angle of a surface of an in-air portion of the transparent member exposed to the in-air space is changeable, an optical signal to be transmitted from the underwater space to the in-air space enters the transparent member from the underwater space via a surface of an underwater portion of the transparent member immersed in the underwater space, and thereafter, is emitted into the in-air space via the surface of the in-air portion, the transparent member includes a plurality of small regions having refractive indices different from each other, and an emitting direction of the optical signal emitted from the surface of the in-air portion into the in-air space is controlled by changing at least one of a refractive index of each of the plurality of small regions and a relative arrangement of the plurality of small regions.

11. The optical signal emitting direction control apparatus according to claim 10, wherein a color of at least a portion of the transparent member is a same color as an environmental color around the transparent member.

12. The optical signal emitting direction control apparatus according to claim 10, wherein an emitting direction of the optical signal emitted from the surface of the in-air portion into the in-air space is controlled by adjusting at least one of an incident angle of the optical signal incident on the surface of the underwater portion from the underwater space and an inclination angle of the surface of a portion of the in-air portion irradiated with the optical signal.

\* \* \* \* \*